US009906283B2

(12) United States Patent
Yu (10) Patent No.: US 9,906,283 B2
(45) Date of Patent: Feb. 27, 2018

(54) UPLINK INTERFERENCE INHIBITION METHOD AND DEVICE

(71) Applicant: Huawei Technologies Co., Ltd., Shenzhen, Guangdong (CN)

(72) Inventor: Rongdao Yu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 182 days.

(21) Appl. No.: 14/810,141

(22) Filed: Jul. 27, 2015

(65) Prior Publication Data
US 2015/0333809 A1 Nov. 19, 2015

Related U.S. Application Data

(63) Continuation of application No. PCT/CN2013/083445, filed on Sep. 13, 2013.

(30) Foreign Application Priority Data

Jan. 28, 2013 (CN) .......................... 2013 1 0031046

(51) Int. Cl.
- *H04W 4/00* (2009.01)
- *H04B 7/04* (2017.01)

(Continued)

(52) U.S. Cl.
CPC ......... *H04B 7/0465* (2013.01); *H04B 17/345* (2015.01); *H04J 11/003* (2013.01);
(Continued)

(58) Field of Classification Search
CPC ....... H04B 7/04; H04B 7/0465; H04W 52/24; H04W 52/243
(Continued)

(56) References Cited

U.S. PATENT DOCUMENTS 8,774,014 B2 * 7/2014 Seo ...................... H04B 7/2606
370/246
8,976,729 B2 * 3/2015 Luo ...................... H04W 52/146
370/328

(Continued)

FOREIGN PATENT DOCUMENTS

| CN | 102223700 A | 10/2011 |
| CN | 102547955 A | 7/2012 |

(Continued)

OTHER PUBLICATIONS

Sadek et al., "A Leakage-Based Precoding Scheme for Downlink Multi-User MIMO Channels," IEEE Transactions on Wireless Communications, vol. 6, Issue 5, pp. 1711-1721, Institute of Electrical and Electronics Engineers, New York, New York (May 2007).

(Continued)

*Primary Examiner* — Farah Faroul
(74) *Attorney, Agent, or Firm* — Leydig, Voit & Mayer, Ltd.

(57) ABSTRACT

The embodiments of the present invention provides an uplink interference inhibition method and user equipment. In the method, an objective function is established, and a pre-coding vector of the user equipment (UE) signal transmission is solved according to the objective function under a constraint condition, such that the larger the available signal power of the UE is, the better, and the smaller the interference of Device to Device (D2D) signal transmission to cellular uplink is, the better; and the best is if the interference of the UE to cellular uplink is within the first threshold and the reliability of the UE signal transmission, thus in the case of multiplexing spectrum resources of cellular communication in D2D communication, the interference between the D2D transmission link and the cellular uplink transmission link may be inhibited by means of the design of the pre-coding vector of the UE signal transmission.

12 Claims, 7 Drawing Sheets

(51) Int. Cl.
*H04W 16/14* (2009.01)
*H04L 25/03* (2006.01)
*H04W 52/04* (2009.01)
*H04W 52/36* (2009.01)
*H04B 17/345* (2015.01)
*H04J 11/00* (2006.01)
*H04W 52/24* (2009.01)
*H04W 76/02* (2009.01)
*H04W 52/14* (2009.01)
*H04B 17/26* (2015.01)

(52) U.S. Cl.
CPC .............. *H04L 25/03* (2013.01); *H04W 16/14* (2013.01); *H04W 52/04* (2013.01); *H04W 52/367* (2013.01); *H04B 17/26* (2015.01); *H04W 52/146* (2013.01); *H04W 52/243* (2013.01); *H04W 76/023* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 9,258,823 | B2* | 2/2016 | Sun | H04W 28/048 |
| 2010/0227565 | A1* | 9/2010 | Sun | H04W 68/08 |
| | | | | 455/67.11 |
| 2011/0255625 | A1* | 10/2011 | Song | H04B 7/024 |
| | | | | 375/267 |
| 2012/0077510 | A1 | 3/2012 | Chen et al. | |
| 2012/0182973 | A1* | 7/2012 | Liu | H04B 7/0404 |
| | | | | 370/335 |
| 2012/0281783 | A1* | 11/2012 | Cheng | H04B 7/0456 |
| | | | | 375/295 |
| 2014/0050278 | A1* | 2/2014 | Bergman | H04B 7/0404 |
| | | | | 375/267 |
| 2014/0113677 | A1* | 4/2014 | Parkvall | H04W 52/146 |
| | | | | 455/522 |
| 2014/0140313 | A1* | 5/2014 | Liu | H04W 52/346 |
| | | | | 370/329 |
| 2015/0043444 | A1* | 2/2015 | Wei | H04W 76/023 |
| | | | | 370/329 |
| 2015/0110037 | A1* | 4/2015 | Wu | H04L 5/0048 |
| | | | | 370/329 |
| 2016/0081039 | A1* | 3/2016 | Lindoff | H04W 52/383 |
| | | | | 455/450 |

FOREIGN PATENT DOCUMENTS

| | | |
|---|---|---|
| CN | 102724675 A | 10/2012 |
| CN | 102858012 A | 1/2013 |
| CN | 102883451 A | 1/2013 |
| EP | 2757751 A2 | 7/2014 |
| WO | WO 2012034269 A1 | 3/2012 |

OTHER PUBLICATIONS

Lee et al., "A Novel Uplink MIMO Transmission Scheme in a Multicell Environment," IEEE Transactions on Wireless Communications, vol. 8, Issue 10, pp. 4981-4987, Institute of Electrical and Electronics Engineers, New York, New York (Oct. 2009).

* cited by examiner

UPLINK INTERFERENCE INHIBITION METHOD AND DEVICE

CROSS-REFERENCE TO RELATED APPLICATIONS

This application is a continuation of International Application No. PCT/CN2013/083445, filed on Sep. 13, 2013, which claims priority to Chinese Patent Application No. 201310031046.5, filed on Jan. 28, 2013, both of which are hereby incorporated by reference in their entireties.

FIELD OF THE INVENTION

The embodiments of the present invention relates to the field of communications, and particularly to an uplink interference inhibition method and device.

BACKGROUND OF THE INVENTION

At present, the existing 3G and 4G cellular mobile communication systems belong to typical infrastructure networks, in which a high-power transmitter is replaced by a plurality of small-power transmitters. A small coverage corresponding to each small transmitter is called a cell, each cell is allocated a group of channels and correspondingly uses a group of wireless resources. Neighboring cells use different wireless resources to prevent mutual interference, and cells with far distances may repeatedly use the same radio resources, thus the spatial multiplexing of wireless channel resources to greatly improve system capacity.

Device to Device (D2D) communication does not need to be controlled by a base station or an access point, thus communication or networking is very flexible. The introduction of a terminal self-organizing communication mode for terminals of the cellular mobile communication system will bring a series of benefits, wherein a direct advantage is that close local service is directly completed by relay forwarding between the terminals without using a base station, to reduce occupation of base station resources; the second advantage is that a coverage defect of a preset network may be compensated to eliminate some blind areas within the coverage area of the existing cellular mobile communication systems; and the third advantage is that power consumption may be reduced, wherein when the communication is achieved by converting a long path into several short paths, sum of power of these short paths is smaller than necessary power of one long path; in addition, the self-organizing manner is introduced to improve capacity of the entire mobile communication system, in order to increase spatial multiplexing. However, in the case of multiplexing spectrum resources of cellular communication in D2D communication, there is need of a solution of how to effectively control and manage interference between D2D communication and cellular communication, in order to effectively combine the D2D communication with the cellular communication to improve spectral efficiency of the system.

SUMMARY OF THE INVENTION

The purpose of the embodiments of the present invention is to provide an uplink interference inhibition method and device, for solving the problem of how to effectively control and manage the interference between D2D communication and cellular communication in the case of multiplexing spectrum resources of cellular communication in D2D communication.

In the first aspect, an uplink interference inhibition method is provided, including:

establishing an objective function according to available signal power of user equipment (UE) transmission, power of interference of the UE transmission to cellular uplink and noise power, wherein the objective function is used for solving a pre-coding vector of the UE signal transmission;

solving the pre-coding vector of the UE signal transmission in the objective function under a constraint condition that the pre-coding vector of the UE signal transmission is a unitary matrix; and processing a UE transmission signal according to the pre-coding vector of the UE signal transmission to ensure minimum interference of the UE transmission signal to the cellular uplink.

In combination with the first aspect, in the first possible implementation manner of the first aspect, the establishing an objective function according to available signal power of user equipment (UE) transmission, power of interference of the UE transmission to cellular uplink and noise power, comprises:

establishing the objective function, wherein the objective function is a ratio obtained by dividing the available signal power of the UE transmission by the sum of the power of interference of the UE transmission to the cellular uplink and the noise power.

In combination with the first aspect or the first possible implementation manner of the first aspect, in the second possible implementation manner of the first aspect, the solving the pre-coding vector of the UE signal transmission in the objective function under a constraint condition that the pre-coding vector of the UE signal transmission is a unitary matrix, comprises:

taking a partial derivative of the objective function with respective to the pre-coding vector of the UE signal transmission, and setting the partial derivative to 0 to obtain an equation;

converting form of the equation into $AW_D = KW_D$, wherein A refers to a matrix, K refers to a characteristic value of A, and $W_D$ refers to a characteristic vector corresponding to the characteristic value K of A; and setting the pre-coding vector of the UE signal transmission to a characteristic vector corresponding to a maximum characteristic value of A.

In the second aspect, an uplink interference inhibition method is provided, including:

establishing an objective function according to mean square error of UE receiving signals, wherein the objective function is used for solving a pre-coding vector of the UE signal transmission;

solving the pre-coding vector of the UE signal transmission in the objective function under a constraint condition that power of uplink interference of the UE is smaller than a first preset threshold and total signal power of the UE transmission is smaller than a second preset threshold; and processing a UE transmission signal according to the pre-coding vector of the UE signal transmission to ensure minimum interference of the UE transmission signal to cellular uplink.

In combination with the second aspect, in the first possible implementation manner of the second aspect, the solving the pre-coding vector of the UE signal transmission in the objective function under a constraint condition that power of uplink interference of the UE is smaller than a first preset threshold and total signal power of the UE transmission is smaller than a second preset threshold, comprises:

solving a pre-coding vector W1 of a first optimal UE signal transmission according to the objective function, when the first constraint condition is that the power of uplink interference of the UE is smaller than the first preset threshold;

solving a pre-coding vector W2 of a second optimal UE signal transmission according to the objective function, when the second constraint condition is that the total signal power of the UE transmission is smaller than the second preset threshold; and obtaining the pre-coding vector of the UE signal transmission in the objective function according to a formula $W_D=c*(a*W1+b*W2)$, wherein a, b and c are constants, a+b=1 and selected c enables $W_D$ to satisfy the first constraint condition and the second constraint condition.

In the third aspect, user equipment is provided, including:

a first establishing unit, configured to establish an objective function according to available signal power of user equipment (UE) transmission and power of interference of the UE transmission to cellular uplink and noise power, wherein the objective function is used for solving a pre-coding vector of the UE signal transmission;

a first solving unit, configured to solve the pre-coding vector of the UE signal transmission in the objective function under a constraint condition that the pre-coding vector of the UE signal transmission is a unitary matrix; and a first processing unit, configured to process a UE transmission signal according to the pre-coding vector of the UE signal transmission to ensure minimum interference of the UE transmission signal to the cellular uplink.

In combination with the third aspect, in the first possible implementation manner of the third aspect, the first establishing unit is specifically configured to:

establish the objective function, wherein the objective function is a ratio obtained by dividing the available signal power of the UE transmission by the sum of the power of interference of the UE transmission to the cellular uplink and the noise power.

In combination with the third aspect or the first possible implementation manner of the third aspect, in the second possible implementation manner of the third aspect, the first solving unit includes:

a partial derivative unit, configured to take a partial derivative of the objective function with respect to the pre-coding vector of the UE signal transmission, and set the partial derivative to 0 to obtain an equation;

a converting unit, configured to convert form of the equation into $AW_D=KW_D$, wherein A refers to a matrix, K refers to the characteristic value of A, $W_D$ refers to a characteristic vector corresponding to the characteristic value K of A; and a first solving subunit, configured to set the pre-coding vector of the UE signal transmission to a characteristic vector corresponding to a maximum characteristic value of A.

In the fourth aspect, user equipment is provided, including:

a second establishing unit, configured to establish an objective function according to mean square error of UE receiving signals, wherein the objective function is used for solving a pre-coding vector of the UE signal transmission;

a second solving unit, configured to solve the pre-coding vector of the UE signal transmission in the objective function under a constraint condition that power of uplink interference of the UE is smaller than a first preset threshold and the total signal power of the UE transmission is smaller than a second preset threshold; and a second processing unit, configured to process a UE transmission signal according to the pre-coding vector of the UE signal transmission to ensure minimum interference of the UE transmission signal to cellular uplink.

In combination with the fourth aspect, in the first possible implementation manner of the fourth aspect, the second solving unit includes:

a third processing unit configured to solve a pre-coding vector W1 of a first optimal UE signal transmission according to the objective function, when the first constraint condition is that the power of uplink interference of the UE is smaller than the first preset threshold;

a fourth processing unit configured to solve a pre-coding vector W2 of a second optimal UE signal transmission according to the objective function, when the second constraint condition is that the total signal power of the UE transmission is smaller than the second preset threshold; and a fifth processing unit, configured to obtain the pre-coding vector of the UE signal transmission in the objective function according to a formula $W_D=c*(a*W1+b*W2)$, wherein a, b and c are constants, a+b=1 and selected c enables $W_D$ to satisfy the first constraint condition and the second constraint condition.

Compared with the prior art, the embodiments of the present invention provide an uplink interference inhibition method, wherein in the method, the objective function, which is a ratio obtained by dividing the available signal power of user equipment (UE) by the sum of the power of uplink interference of the UE and the noise power, is established, and under the constraint condition that the pre-coding vector of the UE signal transmission is the unitary matrix, the pre-coding vector of the UE signal transmission is solved according to the objective function, such that the larger available signal power of the UE is the better, and the smaller interference of D2D signal transmission to cellular uplink is the better. Or, the objective function, which is the mean square error of UE receiving signals, is established, and when the constraint condition is that the power of uplink interference of the UE is smaller than the first preset threshold and the total signal power of the UE transmission is smaller than the second preset threshold, the pre-coding vector of the UE signal transmission is solved according to the objective function, thus the interference of the UE to the cellular uplink is within the first threshold and the reliability of the UE signal transmission is the best, such that in the case of multiplexing spectrum resources of cellular communication in D2D communication, the interference between the D2D transmission link and the cellular uplink transmission link may be inhibited by means of the design of the pre-coding vector of the UE signal transmission. As a result, the spectral efficiency and capacity of the system are greatly improved.

DETAILED DESCRIPTION OF THE EMBODIMENTS

In order that the technical problems, technical solutions and beneficial effects of the present invention are clearer, a further detailed description of the present invention will be given below in combination with accompanying drawings and embodiments. It should be understood that, the specific embodiments described herein are merely used for explaining the present invention, rather than limiting the present invention.

The First Embodiment

Figure 1:
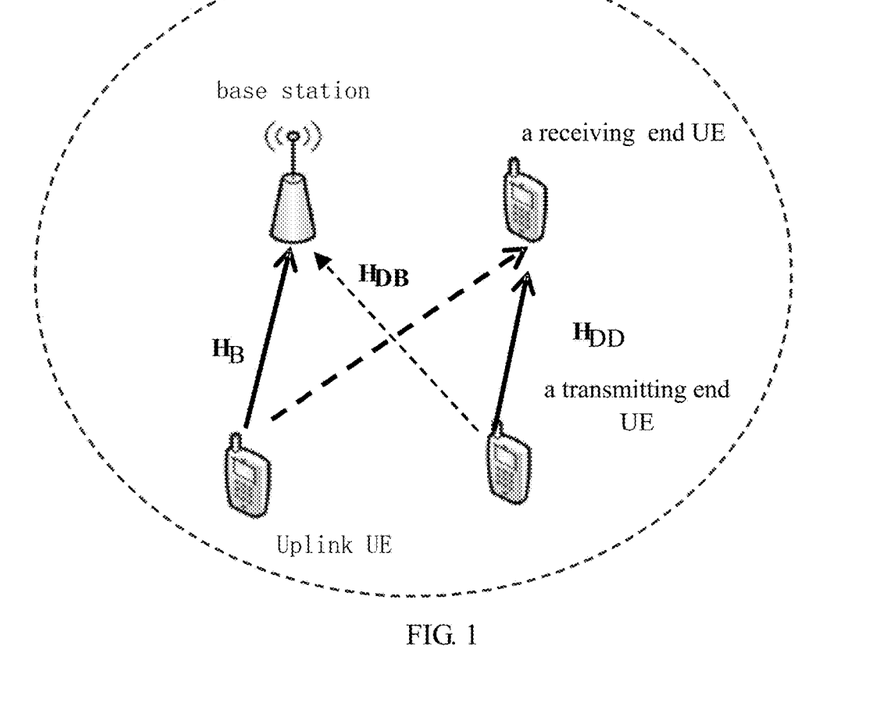
FIG. 1 is an application scenario diagram of an uplink interference inhibition method provided by an embodiment of the present invention.

Referring to FIG. 1, FIG. 1 is an application scenario diagram of an uplink interference inhibition method provided by an embodiment of the present invention.

As shown in FIG. 1, a cellular uplink user equipment (User Equipment, UE) communicates with a base station (Base Station, BS), a transmitting end user equipment performs Device to Device (D2D) transmission with a receiving end user equipment, and spectrum resources of cellular uplink are multiplexed in D2D transmission. A pre-coding vector transmitted by the transmitting end user equipment is pre-coded in two pre-coding manners in the embodiment of the present invention to effectively inhibit interference of D2D transmission to cellular transmission and improve total capacity of the system. The two pre-coding manners are respectively as follows: under the condition that during transmission of the transmitting end user equipment, larger available signal power is better and smaller interference of the D2D transmission to the cellular uplink is better, an objective function is established and the pre-coding vector of signal transmission of the transmitting end user equipment is solved; or under the condition that the interference of the D2D transmission to the cellular uplink is inhibited within a certain threshold range and the total power of the D2D transmission is within a certain power range, when signal reliability during the D2D transmission is the best, the objective function is established and the pre-coding vector of signal transmission of the transmitting end user equipment is solved.

Figure 2:
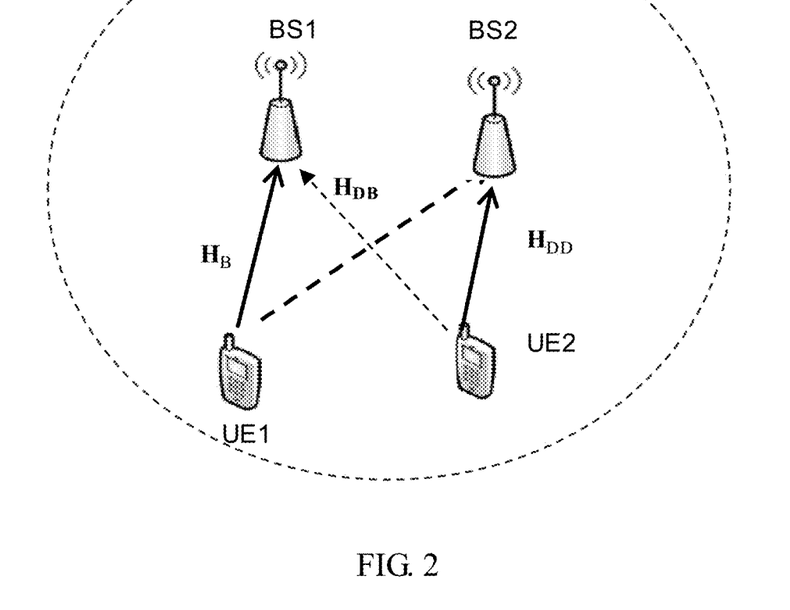
FIG. 2 is an application scenario diagram of another uplink interference inhibition method provided by an embodiment of the present invention.

Referring to FIG. 2, FIG. 2 is an application scenario diagram of another uplink interference inhibition method provided by an embodiment of the present invention.

As shown in FIG. 2, cellular uplink UE1 communicates with BS1, cellular uplink UE2 communicates with BS2, and UE2 and UE1 transmit on same frequency resources, then a pre-coding vector transmitted by the UE1 or the UE2 is pre-coded in two pre-coding manners in the embodiment of the present invention to effectively inhibit interference of signal transmission between cells and improve total capacity of the system. The two pre-coding manners are respectively as follows: under the condition that during UE1 or UE2 transmission, larger available signal power is better and smaller interference of the UE1 or UE2 to another cell is better, an objective function is established and the pre-coding vector of signal transmission of the UE1 or UE2 is solved; or under the condition that the interference of the UE1 or UE2 transmission to the other cell is inhibited within a certain threshold range and total power of the UE1 or UE2 transmission is within a certain power range, when signal reliability during the UE1 or UE2 transmission is the best, the objective function is established and the pre-coding vector of signal transmission of the UE1 or UE2 is solved.

The Second Embodiment

Figure 3:
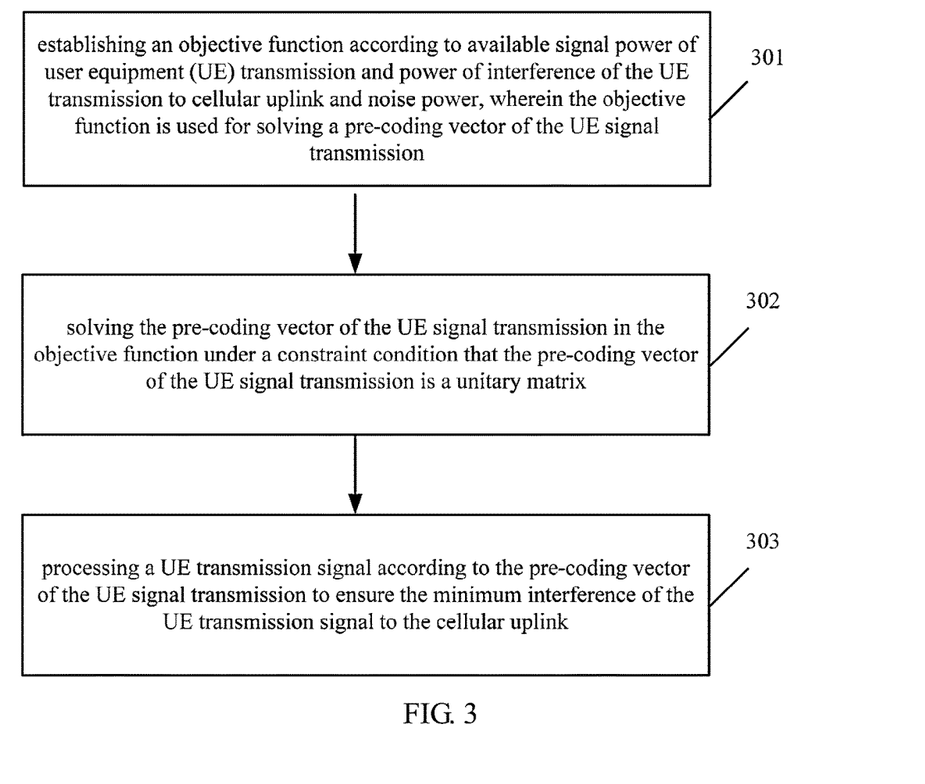
FIG. 3 is a flowchart of an uplink interference inhibition method provided by embodiment 2 of the present invention.

Referring to FIG. 3, FIG. 3 is a flowchart of an uplink interference inhibition method provided by embodiment 2 of the present invention. As shown in FIG. 3, the method includes the following steps:

step 301, establishing an objective function according to available signal power of user equipment (UE) transmission and power of interference of the UE transmission to cellular uplink and noise power, wherein the objective function is used for solving a pre-coding vector of the UE signal transmission;

optionally, the establishing an objective function according to the available signal power of user equipment (UE) transmission and power of interference of the UE transmission to cellular uplink and noise power, includes:

establishing the objective function, wherein the objective function is a ratio obtained by dividing user signal power of the UE transmission by sum of the power of interference of the UE transmission to the cellular uplink and the noise power.

Specifically, the objective function and the constraint condition are:

$$obj \max_{W_D} \frac{tr(W_D^H H_{DD}^H H_{DD} W_D)}{tr(W_D^H H_{DB}^H H_{DB} W_D) + \sigma^2}$$

$$\text{s.t. } W_D^H W_D = I$$

wherein, $W_D$ refers to the pre-coding vector of the UE signal transmission; $H_{DD}$ refers to a channel matrix of the UE D2D transmission; $H_{DB}$ refers to a channel matrix of interference of the UE transmission to the cellular uplink; and I refers to a unit matrix;

the available signal power of the user equipment (UE) is: $tr(W_D^H H_{DD}^H H_{DD} W_D)$;

the uplink interference power of the UE is: $tr(W_D^H H_{DB}^H H_{DB} W_D)$;

and the noise power is $\sigma^2$.

$W_D^H W_D = I$ refers to the constraint condition, namely, it is hoped that the pre-coding vector $W_D$ of the UE signal transmission is a unitary matrix.

step 302, solving the pre-coding vector of the UE signal transmission in the objective function under a constraint condition that the pre-coding vector of the UE signal transmission is a unitary matrix;

optionally, the solving the pre-coding vector of the UE signal transmission in the objective function under a constraint condition that the pre-coding vector of the UE signal transmission is a unitary matrix, includes:

taking a partial derivative of the objective function with respective to the pre-coding vector of the UE signal transmission, and setting the partial derivative to 0 to obtain an equation;

converting form of the equation into $AW_D = KW_D$, wherein A refers to a matrix, K refers to a characteristic value of A, and $W_D$ a characteristic vector corresponding to the characteristic value K of A; and setting the pre-coding vector of the UE signal transmission to a characteristic vector corresponding to a maximum characteristic value of A. For the objective function $$\frac{tr(W_D^H H_{DD}^H H_{DD} W_D)}{tr(W_D^H H_{DB}^H H_{DB} W_D) + \sigma^2}$$

the partial derivative with respect to $W_D$ is solved, and the partial derivative is set as 0, then:

$$(H_{DD}^H H_{DD}) W_D = \frac{tr(W_D^H H_{DD}^H H_{DD} W_D)}{tr(W_D^H H_{DB}^H H_{DB} W_D) + \sigma^2} \left( H_{DB}^H H_{DB} + \frac{\sigma^2}{N_t} I \right) W_D$$

wherein, $H_{DB}^H H_{DB} + \frac{\sigma^2}{N_t} I$ is a positive definite Hermitian matrix and is reversible, therefore:

$$\left( H_{DB}^H H_{DB} + \frac{\sigma^2}{N_t} I \right)^{-1} \cdot (H_{DD}^H H_{DD}) \cdot W_D = \frac{tr(W_D^H H_{DD}^H H_{DD} W_D)}{tr(W_D^H H_{DB}^H H_{DB} W_D) + \sigma^2} \cdot W_D$$

It can be seen from the above-mentioned formula that: the characteristic vector of the maximum characteristic value of $$\left( H_{DB}^H H_{DB} + \frac{\sigma^2}{N_t} I \right)^{-1} \cdot (H_{DD}^H H_{DD})$$

makes $$\frac{tr(W_D^H H_{DD}^H H_{DD} W_D)}{tr(W_D^H H_{DB}^H H_{DB} W_D) + \sigma^2}$$

be the maximum, then the characteristic vector can be set to the pre-coding vector of D2D UE signal transmission Since $H_{DD}^H H_{DD}$ is a Hermitian matrix of N*N and $$H_{DB}^H H_{DB} + \frac{\sigma^2}{N_t} I$$

is the positive definite Hermitian matrix and is reversible, it is not necessarily required that the number of UE antennas is larger than the number of BS receiving antennas and is applicable to configuration of any UE and BS antennas.

Step 303, processing a UE transmission signal according to the pre-coding vector of the UE signal transmission to ensure the minimum interference of the UE transmission signal to the cellular uplink.

Specially, the pre-coding vector $W_D$ of the UE signal transmission is multiplied with the channel matrix $H_{DD}$ of the UE transmission and the signal X of the UE transmission, namely $H_{DD} * W_D * X$, to ensure the minimum interference of the UE transmission signal to the cellular uplink.

Figure 4:
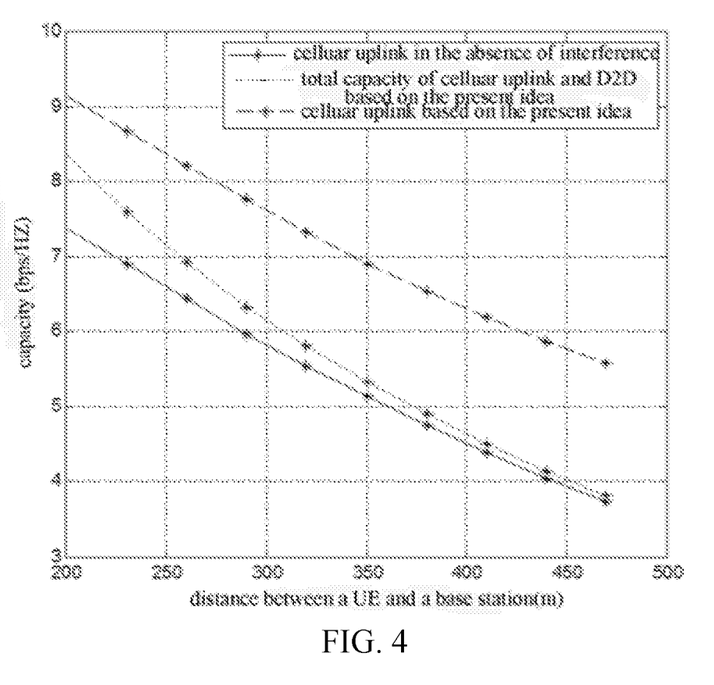
FIG. 4 is a comparison diagram of beneficial effects of the present invention and the prior art provided by an embodiment of the present invention.

As shown in FIG. 4, FIG. 4 is a comparison diagram of the beneficial effects of the present invention provided by an embodiment of the present invention and the prior art. The solid line indicates a capacity curve of cellular uplink in the absence of interference, the dashed line indicates a capacity curve of cellular uplink based on a solution in the present invention, and the dotted line indicates a total capacity curve of cellular uplink and D2D based on a solution in an embodiment of the present invention. It can be seen from the figure that, based on the solution in in an embodiment of the present invention, although certain interference is generated on the cellular uplink, but this interference is very small, and the total capacity of the cellular uplink and D2D is greatly improved relative to the interference-free cellular uplink.

The embodiments of the present invention provides an uplink interference inhibition method, wherein in the method, the objective function, which is a ratio obtained by dividing the available signal power of user equipment (UE) by the sum of the power of uplink interference of the UE and the noise power, is established, and under the constraint condition that the pre-coding vector of the signal transmission of the user equipment is the unitary matrix, the pre-coding vector of the UE signal transmission is solved according to the objective function, such that the larger the available signal power of the UE is the better, and the smaller the interference of D2D signal transmission to cellular uplink is, the better. Thus in the case of multiplexing spectrum resources of cellular communication in D2D communication, the interference between the D2D transmission link and the cellular uplink transmission link may be inhibited by means of the design of the pre-coding vector of the UE signal transmission. As a result, the spectral efficiency and capacity of the system are greatly improved.

The Third Embodiment

Figure 5:
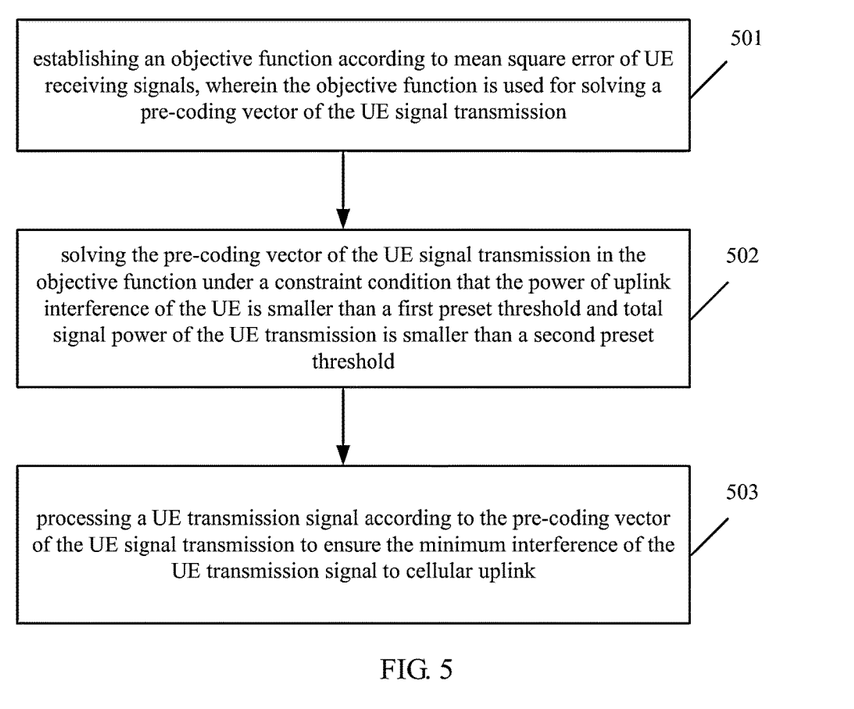
FIG. 5 is a flowchart of an uplink interference inhibition method provided by embodiment 3 of the present invention.

Referring to FIG. 5, FIG. 5 is a flowchart of an uplink interference inhibition method provided by embodiment 3 of the present invention. As shown in FIG. 5, the method includes the following steps:

step 501, establishing an objective function according to mean square error of UE receiving signals, wherein the objective function is used for solving a pre-coding vector of the UE signal transmission;

Specially, $tr([I+H_D{}^H H_{DD}{}^H I_Z H_{DD} W_D]^{-1})$ refers to the mean square error of the UE receiving signals, and the objective function is $tr([I+W_D{}^H H_{DD}{}^H I_Z H_{DD} W_D]^{-1})$.

step 502, solving the pre-coding vector of the UE signal transmission in the objective function under a constraint condition that the power of uplink interference of the UE is smaller than a first preset threshold and total signal power of the UE transmission is smaller than a second preset threshold;

optionally, the solving the pre-coding vector of the UE signal transmission in the objective function under a constraint condition that the power of uplink interference of the UE is smaller than a first preset threshold and the total signal power of the UE transmission is smaller than a second preset threshold, includes:

solving a pre-coding vector W1 of a first optimal UE signal transmission according to the objective function, when the first constraint condition is that the power of uplink interference of the UE is smaller than the first preset threshold;

solving a pre-coding vector W2 of a second optimal UE signal transmission according to the objective function, when the second constraint condition is that the total signal power of the UE transmission is smaller than the second preset threshold;

obtaining the pre-coding vector of the UE signal transmission in the objective function according to a formula $W_D = c*(a*W1+b*W2)$, wherein a, b and c are constants, a+b=1 and the selected c enables $W_D$ to satisfy the first constraint condition and the second constraint condition.

Specifically, the objective function and the constraint condition are:

$$\min tr([I+W_D^H H_{DD}^H I_Z H_{DD} W_{DD}]^{-1})$$

$$s.t.\ tr(H_{DB} W_D W_D^H H_{DB}^H) < T$$

$$tr(W_D^H W_D) < P$$

wherein, $W_D^H W_D$ refers to the total signal power of the UE transmission, Iz refers to a covariance matrix of noise, $tr([I+W_D^H H_{DD}^H I_Z H_{DD} W_D]^{-1})$ refers to the mean square error of the UE receiving signals, T refers to the first preset threshold than which the uplink interference power of the UE is smaller, and P refers to the second preset threshold than which the total signal power of the UE transmission is smaller.

Specifically, corresponding optimal pre-coders W1 and W2 are found out aiming at the first constraint condition $tr(H_{DB} W_D W_D^H H_{DB}^H) < T$ and the second constraint condition $tr(W_D^H W_D) < P$. When only the first constraint condition or the second constraint condition is considered, the above-mentioned optimization problem has a closed optimal solution.

The final pre-coder is $W_D = c*(a*W1+b*W2)$, wherein a, b and c are constants, a+b=1, and a scaling factor c is selected to satisfy the first constraint condition and the second constraint condition.

Step 503, processing a UE transmission signal according to the pre-coding vector of the UE signal transmission to ensure the minimum interference of the UE transmission signal to cellular uplink.

Specially, the pre-coding vector $W_D$ of the UE signal transmission is multiplied with a channel matrix $H_{DD}$ of the UE transmission and signal X of the UE transmission, namely $H_{DD}*W_D*X$, to ensure the minimum interference of the UE transmission signal to cellular uplink.

The embodiments of the present invention provides an uplink interference inhibition method, in the method, the objective function, which is the minimum value of the mean square error of UE receiving signals, is established, and when the constraint condition is that the uplink interference power of the UE is smaller than the first preset threshold and the total signal power of the UE transmission is smaller than the second preset threshold, the pre-coding vector of the UE signal transmission is solved according to the objective function. Thus the interference of the UE to cellular uplink is within the first threshold and reliability of the UE signal transmission is the best, such that in the case of multiplexing spectrum resources of cellular communication in D2D communication, the interference between the D2D transmission link and the cellular uplink transmission link may be inhibited by means of the design of the pre-coding vector of the UE signal transmission. As a result, spectral efficiency and capacity of the system are greatly improved.

The Fourth Embodiment

Figure 6:
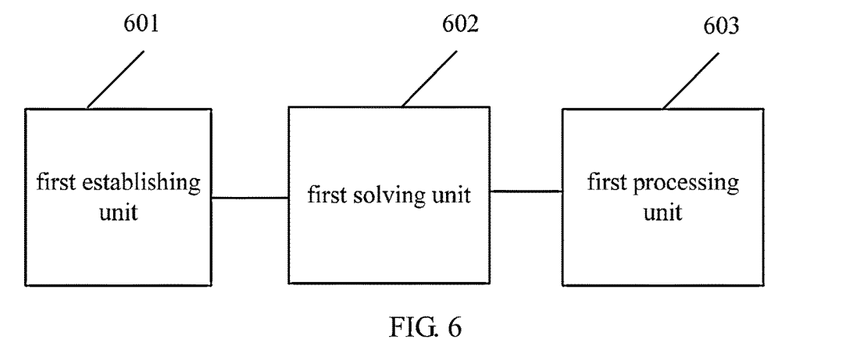
FIG. 6 is an apparatus structure diagram of a user equipment provided by embodiment 4 of the present invention.

Referring to FIG. 6, FIG. 6 is an apparatus structure diagram of user equipment provided by embodiment 4 of the present invention. As shown in FIG. 6, the user equipment includes:

a first establishing unit 601, configured to establish an objective function according to available signal power of user equipment (UE) transmission and power of interference of the UE transmission to cellular uplink and noise power, wherein the objective function is used for solving a pre-coding vector of the UE signal transmission;

optionally, the first establishing unit is specifically configured to:

establishing the objective function, wherein the objective function is a ratio obtained by dividing the user signal power of the UE transmission by the sum of the power of interference of the UE transmission to the cellular uplink and the noise power.

Specifically, the objective function and the constraint condition are:

$$obj \max_{W_D} \frac{tr(W_D^H H_{DD}^H H_{DD} W_D)}{tr(W_D^H H_{DB}^H H_{DB} W_D) + \sigma^2}$$

$$s.t.\ W_D^H W_D = I$$

wherein, $W_D$ refers to the pre-coding vector of the UE signal transmission; $H_{DD}$ refers to a channel matrix of the UE D2D transmission; $H_{DB}$ refers to a channel matrix of interference of the UE transmission to the cellular uplink; and I refers to a unit matrix;

the available signal power of the user equipment (UE) is: $tr(W_D^H H_{DD}^H H_{DD} W_D)$ the uplink interference power of the UE is: $tr(W_D^H H_{DB}^H H_{DB} W_D)$; and the noise power is $\sigma^2$.

Figure 7:
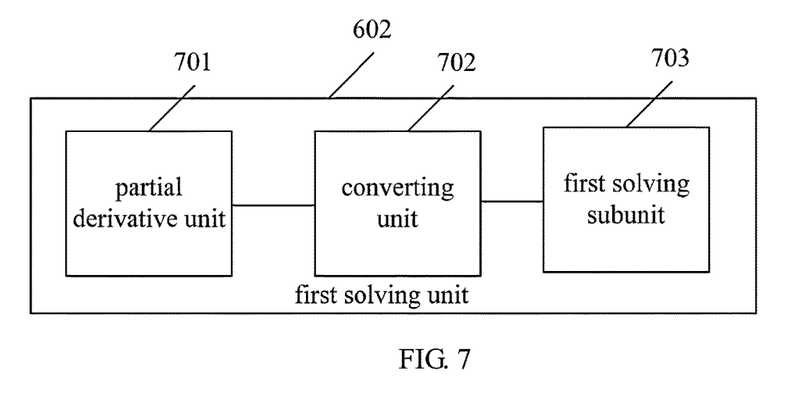
FIG. 7 is an apparatus structure diagram of a first solving unit in a user equipment provided by embodiment 4 of the present invention.

$W_D^H W_D = I$ refers to the constraint condition, namely, it is hoped that the pre-coding vector $W_D$ of the UE signal transmission is a unitary matrix.

a first solving unit 602, configured to solve the pre-coding vector of the UE signal transmission in the objective function under a constraint condition that the pre-coding vector of the UE signal transmission is a unitary matrix;

optionally, the first solving unit 602 includes:

a partial derivative unit 701, configured to take a partial derivative of the objective function with respective to the pre-coding vector of the UE signal transmission, and set the partial derivative to 0 to obtain an equation;

a converting unit 702, configured to convert form of the equation into $AW_D = KW_D$, wherein A refers to a matrix, K refers to a characteristic value of A, $W_D$ refers to a characteristic vector corresponding to the characteristic value K of A; and a first solving subunit 703, configured to set the pre-coding vector of the UE signal transmission to a characteristic vector corresponding to a maximum characteristic value of A.

For the objective function $$\frac{tr(W_D^H H_{DD}^H H_{DD} W_D)}{tr(W_D^H H_{DB}^H H_{DB} W_D) + \sigma^2}$$

the partial derivative with respective to $W_D$ is solved, and the partial derivative is set to 0, then:

$$(H_{DD}^H H_{DD})W_D = \frac{tr(W_D^H H_{DD}^H H_{DD} W_D)}{tr(W_D^H H_{DB}^H H_{DB} W_D) + \sigma^2}\left(H_{DB}^H H_{DB} + \frac{\sigma^2}{N_t}I\right)W_D$$

wherein, $H_{DB}^H H_{DB} + \frac{\sigma^2}{N_t}I$ is a positive definite Hermitian matrix and is reversible, therefore:

$$\left(H_{DB}^H H_{DB} + \frac{\sigma^2}{N_t}I\right)^{-1} \cdot (H_{DD}^H H_{DD}) \cdot W_D = \frac{tr(W_D^H H_{DD}^H H_{DD} W_D)}{tr(W_D^H H_{DB}^H H_{DB} W_D) + \sigma^2} \cdot W_D$$

It can be seen from the above-mentioned formula that the characteristic vector of the maximum characteristic value of $$\left(H_{DB}^H H_{DB} + \frac{\sigma^2}{N_t}I\right)^{-1} \cdot (H_{DD}^H H_{DD})$$

makes $$\frac{tr(W_D^H H_{DD}^H H_{DD} W_D)}{tr(W_D^H H_{DB}^H H_{DB} W_D) + \sigma^2}$$

be the maximum, then the characteristic vector can be set to the pre-coding vector of D2D UE signal transmission.

Since $H_{DD}^H H_{DD}$ is a Hermitian matrix of N*N and $$H_{DB}^H H_{DB} + \frac{\sigma^2}{N_t}I$$

is the positive definite Hermitian matrix and is reversible, it is not necessarily required that the number of UE antennas is larger than the number of BS receiving antennas and it is applicable to the configuration of any UE and BS antennas.

A first processing unit 603, configured to process a UE transmission signal according to the pre-coding vector of the UE signal transmission to ensure minimum interference of the UE transmission signal to cellular uplink.

Specially, the pre-coding vector $W_D$ of the UE signal transmission is multiplied with a channel matrix $H_{DD}$ of the UE transmission and signal X of the UE transmission, namely $H_{DD}*W_D*X$, to ensure the minimum interference of the UE transmission signal to cellular uplink.

As shown in FIG. 4, FIG. 4 is a comparison diagram of the beneficial effects of an embodiment of the present invention provided by an embodiment of the present invention and the prior art. The solid line indicates a capacity curve of cellular uplink in the absence of interference, the dashed line indicates a capacity curve of cellular uplink based on a solution in an embodiment of the present invention, and the dotted line indicates a total capacity curve of cellular uplink and D2D based on a solution in an embodiment of the present invention. It can be seen from the figure that, based on the solution in an embodiment in the present invention, although certain interference is generated on cellular uplink, but this interference is very small, and the total capacity of the cellular uplink and D2D is greatly improved relative to the interference-free cellular uplink.

The embodiments of the present invention provides a user equipment, wherein the user equipment establishes the objective function which is a ratio obtained by dividing the available signal power of user equipment (UE) by the sum of the power of uplink interference of the UE and the noise power, and solves the pre-coding vector of the UE signal transmission under the constraint condition that the pre-coding vector of the signal transmission of the user equipment is the unitary matrix according to the objective function, such that the larger the available signal power of the UE is, the better, and the smaller the interference of D2D signal transmission to cellular uplink is, the better. Thus in the case of multiplexing spectrum resources of cellular communication in D2D communication, the interference between the D2D transmission link and the cellular uplink transmission link may be inhibited by means of the design of the pre-coding vector of the UE signal transmission. As a result, the spectral efficiency and capacity of the system are greatly improved.

The Fifth Embodiment

Figure 8:
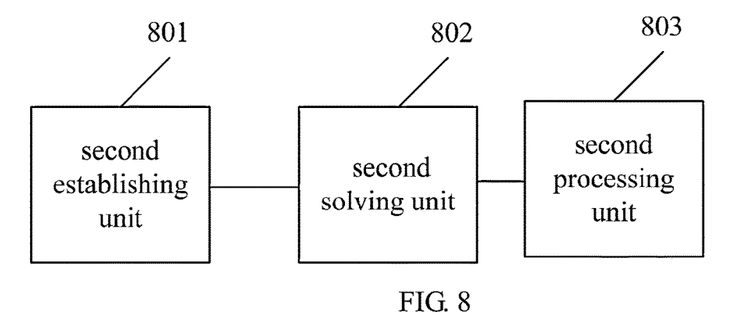
FIG. 8 is an apparatus structure diagram of a user equipment provided by embodiment 5 of the present invention.
Figure 9:
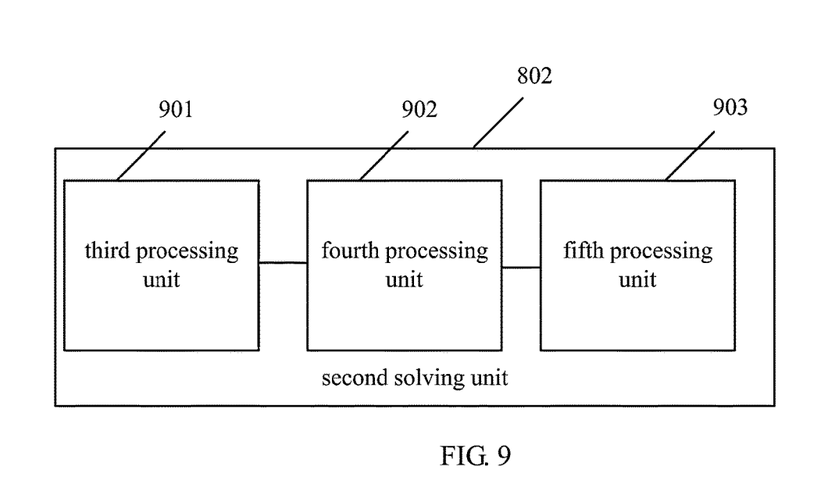
FIG. 9 is an apparatus structure diagram of a second solving unit in a user equipment provided by embodiment 5 of the present invention.

Referring to FIG. 8, FIG. 8 is an apparatus structure diagram of a user equipment provided by embodiment 5 of the present invention. As shown in FIG. 8, the user equipment includes:

a second establishing unit 801, configured to establish an objective function according to mean square error of UE receiving signals, wherein the objective function is used for solving a pre-coding vector of the UE signal transmission;

Specially, $tr([I+W_D^H H_{DD}^H I_Z H_{DD} W_D]^{-1})$ refers to the mean square error of the UE receiving signals, and the objective function is $tr([I+W_D^H H_{DD}^H I_Z H_{DD} W_D]^{-1})$.

a second solving unit 802, configured to solve the pre-coding vector of the UE signal transmission in the objective function under a constraint condition that power of uplink interference of the UE is smaller than a first preset threshold and total signal power of the UE transmission is smaller than a second preset threshold;

optionally, the second solving unit 802 includes:

a third processing unit 901 configured to solve a pre-coding vector W1 of a first optimal UE signal transmission according to the objective function, when the first constraint condition is that the power of uplink interference r of the UE is smaller than the first preset threshold;

a fourth processing unit 902 configured to solve a pre-coding vector W2 of a second optimal UE signal transmission according to the objective function, when the second constraint condition is that the total signal power of the UE transmission is smaller than the second preset threshold;

a fifth processing unit 903, configured to obtain the pre-coding vector of the UE signal transmission in the objective function according to a formula $W_D=c*(a*W1+b*W2)$, wherein a, b and c are constants, $a+b=1$ and the selected c enables $W_D$ to satisfy the first constraint condition and the second constraint condition.

Specifically, the objective function and the constraint condition are:

$$\min tr([I+W_D{}^H H_{DD}{}^H I_Z H_{DD} W_D]^{-1})$$

$$s.t.\ tr(H_{DB} W_D W_D{}^H H_{DB}{}^H) < T$$

$$tr(W_D{}^H W_D) < P$$

wherein, $W_D{}^H W_D$ refers to the total signal power of the UE transmission, Iz refers to a covariance matrix of noise, $tr([I+W_D{}^H H_{DD}{}^H I_Z H_{DD} W_D]^{-1})$ refers to the mean square error of the UE receiving signals, T refers to the first preset threshold than which the uplink interference power of the UE is smaller, and P refers to the second preset threshold than which the total signal power of the UE transmission is smaller.

Specifically, corresponding optimal pre-coders W1 and W2 are found out aiming at the first constraint condition $tr(H_{DB} W_D W_D{}^H H_{DB}{}^H) < T$ and the second constraint condition $tr(W_D{}^H W_D) < P$. When only the first constraint condition or the second constraint condition is considered, the above-mentioned optimization problem has a closed optimal solution.

The final pre-coder is $W_D = c^*(a^*W1 + b^*W2)$, wherein a, b and c are constants, a+b=1, and a scaling factor c is selected to satisfy the first constraint condition and the second constraint condition.

A second processing unit 803, configured to process a UE transmission signal according to the pre-coding vector of the UE signal transmission to ensure minimum interference of the UE transmission signal to cellular uplink.

Specially, the pre-coding vector $W_D$ of the UE signal transmission is multiplied with a channel matrix $H_{DD}$ of the UE transmission and signal X of the UE transmission, namely $H_{DD}*W_D*X$, to ensure the minimum interference of the UE transmission signal to cellular uplink.

The embodiments of the present invention provides a user equipment, wherein the equipment establishes the objective function which is the minimum value of the mean square error of UE receiving signals, and solves the pre-coding vector of the UE signal transmission according to the objective function, when the constraint condition is that the uplink interference power of the UE is smaller than the first preset threshold and the total signal power of the UE transmission is smaller than the second preset threshold. Thus the interference of the UE to cellular uplink is within the first threshold and the reliability of the UE signal transmission is the best, such that in the case of multiplexing spectrum resources of cellular communication in D2D communication, the interference between the D2D transmission link and the cellular uplink transmission link may be inhibited by means of the design of the pre-coding vector of the UE signal transmission. As a result, the spectral efficiency and capacity of the system are greatly improved.

The Sixth Embodiment

Figure 10:
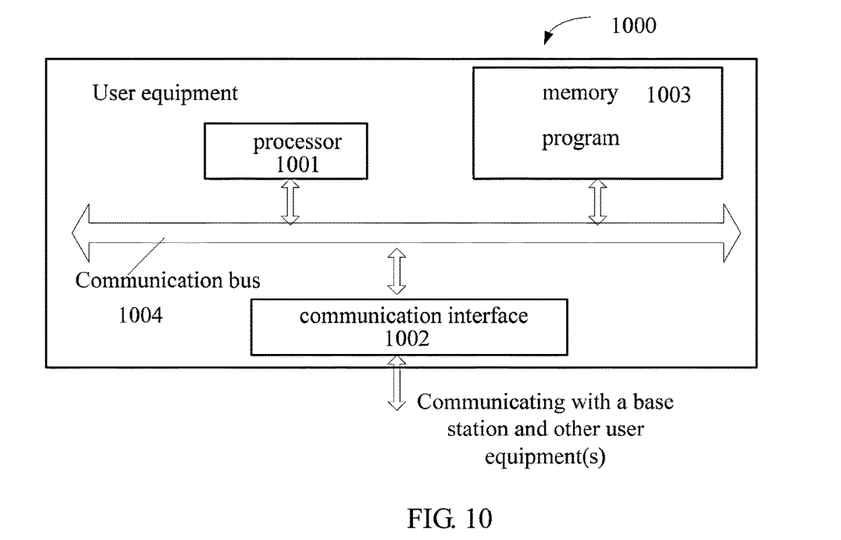
FIG. 10 is an apparatus structure diagram of a user equipment provided by embodiment 6 of the present invention.

Referring to FIG. 10, FIG. 10 is an apparatus structure diagram of user equipment provided by embodiment 6 of the present invention. Referring to FIG. 10, FIG. 10 is a user equipment 1000 provided by an embodiment of the present invention, and the specific implementation of the equipment is not limited in the specific embodiment of the present invention. The user equipment 1000 includes:

a processor 1001, a communication interface 1002, a memory 1003 and a bus 1004.

The processor 1001, the communication interface 1002 and the memory 1003 mutually communicate through the bus 1004.

The communication interface 1002 is used for communicating with a base station and other user equipment; and the processor 1001 is used for implementing a program.

Specifically, the program may include a program code, and the program code includes a computer operating instruction.

The processor 1001 may be a central processor (CPU), or an application specific integrated circuit (ASIC), or one or multiple integrated circuits configured to implement the embodiments in the present invention.

The memory 1003 is used for storing the program. The memory 1003 may include a high-speed RAM memory and may further include a non-volatile memory. The program may specifically include:

establishing an objective function according to available signal power of user equipment (UE) transmission and power of interference of the UE transmission to cellular uplink and noise power, wherein the objective function is used for solving a pre-coding vector of the UE signal transmission;

solving the pre-coding vector of the UE signal transmission in the objective function under a constraint condition that the pre-coding vector of the UE signal transmission is a unitary matrix; and processing a UE transmission signal according to the pre-coding vector of the UE signal transmission to ensure minimum interference of the UE transmission signal to cellular uplink.

The establishing an objective function according to available signal power of user equipment (UE) transmission and power of interference of the UE transmission to cellular uplink and noise power, includes:

establishing the objective function, wherein the objective function is a ratio obtained by dividing the user signal power of the UE transmission by the sum of the interference power and the noise power of the UE transmission to cellular uplink.

The solving the pre-coding vector of the UE signal transmission in the objective function under a constraint condition that the pre-coding vector of the UE signal transmission is a unitary matrix, includes:

extracting a partial derivative of the pre-coding vector of the UE signal transmission for the objective function, and setting the partial derivative to 0 to obtain an equation;

converting the form of the equation into $AW_D = KW_D$, wherein A refers to a matrix, K refers to the characteristic value of A, and $W_D$ refers to a characteristic vector corresponding to the characteristic value K of A; and setting the pre-coding vector of the UE signal transmission as the characteristic vector corresponding to the maximum characteristic value of A.

Or, the program includes:

establishing an objective function according to mean square error of UE receiving signals, wherein the objective function is used for solving a pre-coding vector of the UE signal transmission;

solving the pre-coding vector of the UE signal transmission in the objective function under a constraint condition that the uplink interference power of the UE is smaller than a first preset threshold and the total signal power of the UE transmission is smaller than a second preset threshold; and processing a UE transmission signal according to the pre-coding vector of the UE signal transmission to ensure the minimum interference of the UE transmission signal to cellular uplink.

The solving the pre-coding vector of the UE signal transmission in the objective function under a constraint condition that the uplink interference power of the UE is smaller than a first preset threshold and the total signal power of the UE transmission is smaller than a second preset threshold, includes:

solving a pre-coding vector W1 of a first optimal UE signal transmission according to the objective function, when the first constraint condition is that the uplink interference power of the UE is smaller than the first preset threshold;

solving the pre-coding vector W2 of the second optimal UE signal transmission according to the objective function, when the second constraint condition is that the total signal power of the UE transmission is smaller than the second preset threshold; and obtaining the pre-coding vector of the UE signal transmission in the objective function according to a formula $W_D=c*(a*W1+b*W2)$, wherein a, b and c are constants, a+b=1 and the selected c enables $W_D$ to satisfy the first constraint condition and the second constraint condition.

The foregoing descriptions are merely preferred embodiments of the present invention, rather than limiting the present invention. Any modifications, equivalent substitutions, improvements and the like made within the present invention should be encompassed in the protection scope of the present invention.

What is claimed is:

1. An uplink interference inhibition method, comprising:
establishing an objective function according to available signal power of user equipment (UE) transmission, power of interference of the UE transmission to cellular uplink and noise power, wherein the objective function is used for solving a pre-coding vector for a UE transmission signal;
solving the pre-coding vector of the UE signal transmission in the objective function under a constraint condition that the pre-coding vector of the UE transmission signal is a unitary matrix; and
processing a UE transmission signal according to the pre-coding vector of the UE transmission signal to ensure minimum interference of the UE transmission signal to the cellular uplink.

2. The method of claim 1, wherein the establishing an objective function according to available signal power of user equipment (UE) transmission, power of interference of the UE transmission to cellular uplink and noise power, comprises:
establishing the objective function, wherein the objective function is a ratio obtained by dividing the available signal power of the UE transmission by the sum of the power of interference of the UE transmission to the cellular uplink and the noise power.

3. The method of claim 1, wherein the solving the pre-coding vector for the UE transmission signal in the objective function under a constraint condition that the pre-coding vector for UE transmission signal is a unitary matrix, comprises:
taking a partial derivative of the objective function with respective to the pre-coding vector for the UE transmission signal, and setting the partial derivative to 0 to obtain an equation;
converting the equation into $AW_D=KW_D$, wherein A refers to a matrix, K refers to a characteristic value of A, and $W_D$ refers to a characteristic vector corresponding to the characteristic value K of A; and
setting the pre-coding vector for the UE transmission signal to a characteristic vector corresponding to a maximum characteristic value of A.

4. The method of claim 2, wherein the solving the pre-coding vector for the UE transmission signal in the objective function under a constraint condition that the pre-coding vector for the UE transmission signal is a unitary matrix, comprises:
taking a partial derivative of the objective function with respective to the pre-coding vector for the UE transmission signal, and setting the partial derivative to 0 to obtain an equation;
converting the equation into a form of $AW_D=KW_D$, wherein A refers to a matrix, K refers to a characteristic value of A, and $W_D$ refers to a characteristic vector corresponding to the characteristic value K of A; and
setting the pre-coding vector for the UE transmission signal to a characteristic vector corresponding to a maximum characteristic value of A.

5. An uplink interference inhibition method, comprising:
establishing an objective function according to mean square error of user equipment (UE) receiving signals, wherein the objective function is used for solving a pre-coding vector for the UE transmission signal;
solving the pre-coding vector for the UE transmission signal in the objective function under constraint conditions that power of uplink interference of a UE is smaller than a first preset threshold and total signal power of the UE transmission is smaller than a second preset threshold; and
processing a UE transmission signal according to the pre-coding vector for the UE transmission signal to ensure minimum interference of the UE transmission signal to cellular uplink.

6. The method of claim 5, wherein the solving the pre-coding vector for the UE transmission signal in the objective function under constraint conditions that power of uplink interference of a UE is smaller than a first preset threshold and total signal power of the UE transmission is smaller than a second preset threshold, comprises:
solving a pre-coding vector W1 for a first optimal UE transmission signal according to the objective function, when the first constraint condition is that the power of uplink interference of the UE is smaller than the first preset threshold;
solving a pre-coding vector W2 for a second optimal UE transmission signal according to the objective function, when the second constraint condition is that the total signal power of the UE transmission is smaller than the second preset threshold; and
obtaining the pre-coding vector for the UE transmission signal in the objective function according to a formula $W_D=c*(a*W1+b*W2)$, wherein a, b and c are constants, a+b=1 and the selected c enables $W_D$ to satisfy the first constraint condition and the second constraint condition.

7. A user equipment, comprising a processor and a non-transitory computer-readable storage medium including computer-executable instructions executed by the processor to perform operations comprising:
establishing an objective function according to available signal power of user equipment (UE) transmission and power of interference of the UE transmission to cellular uplink and noise power, wherein the objective function is used for solving a pre-coding vector for the UE transmission signal;

solving the pre-coding vector for the UE transmission signal in the objective function under a constraint condition that the pre-coding vector for the UE transmission signal is a unitary matrix; and processing a UE transmission signal according to the pre-coding vector for the UE transmission signal to ensure minimum interference of the UE transmission signal to the cellular uplink.

8. The equipment of claim 7, wherein the objective function is a ratio obtained by dividing the available signal power of the UE transmission by the sum of the power of interference of the UE transmission to the cellular uplink and the noise power.

9. The equipment of claim 7, wherein solving the pre-coding vector comprises:

taking a partial derivative of the objective function with respective to the pre-coding vector for the UE transmission signal, and set the partial derivative to 0 to obtain an equation;

converting the equation into a form of $AW_D=KW_D$, wherein A refers to a matrix, K refers to the characteristic value of A, $W_D$ refers to a characteristic vector corresponding to the characteristic value K of A; and setting the pre-coding vector for the UE transmission signal to a characteristic vector corresponding to a maximum characteristic value of A.

10. The equipment of claim 8, wherein solving the pre-coding vector comprises:

taking a partial derivative of the objective function with respective to the pre-coding vector for the UE transmission signal, and set the partial derivative to 0 to obtain an equation;

converting the equation into a form of $AW_D=KW_D$, wherein A refers to a matrix, K refers to the characteristic value of A, $W_D$ refers to a characteristic vector corresponding to the characteristic value K of A; and setting the pre-coding vector for the UE transmission signal to a characteristic vector corresponding to a maximum characteristic value of A.

11. A user equipment, comprising a processor and a non-transitory computer-readable storage medium including computer-executable instructions executed by the processor to perform operations comprising:

establishing an objective function according to mean square error of user equipment (UE) receiving signals, wherein the objective function is used for solving a pre-coding vector for the UE transmission signal;

solving the pre-coding vector for the UE transmission signal in the objective function under a constraint condition that power of uplink interference of the UE is smaller than a first preset threshold and the total signal power of the UE transmission is smaller than a second preset threshold; and processing a UE transmission signal according to the pre-coding vector for the UE transmission signal to ensure minimum interference of the UE transmission signal to cellular uplink.

12. The user equipment of claim 11, wherein the solving the pre-coding vector comprises:

solving a pre-coding vector W1 for a first optimal UE transmission signal according to the objective function, when the first constraint condition is that the power of uplink interference of the UE is smaller than the first preset threshold;

solving a pre-coding vector W2 for a second optimal UE transmission signal according to the objective function, when the second constraint condition is that the total signal power of the UE transmission is smaller than the second preset threshold; and obtaining the pre-coding vector of the UE signal transmission in the objective function according to a formula $W_D=c*(a*W1+b*W)$, wherein a, b and c are constants, a+b=1 and selected c enables $W_D$ to satisfy the first constraint condition and the second constraint condition.

* * * * *